United States Patent
Nilsen et al.

(10) Patent No.: US 6,811,693 B2
(45) Date of Patent: Nov. 2, 2004

(54) ELECTROSTATIC COALESCER DEVICE

(75) Inventors: Pål J. Nilsen, Bödalen (NO); Ole-Morten Midtgård, Sandvika (NO); Gorm Sande, Nesbru (NO)

(73) Assignee: ABB Offshore Systems AS, Billingstad (NO)

( * ) Notice: Subject to any disclaimer, the term of this patent is extended or adjusted under 35 U.S.C. 154(b) by 73 days.

(21) Appl. No.: 10/275,005

(22) PCT Filed: Apr. 20, 2001

(86) PCT No.: PCT/IB01/00754

§ 371 (c)(1),
(2), (4) Date: Feb. 3, 2003

(87) PCT Pub. No.: WO01/85297

PCT Pub. Date: Nov. 15, 2001

(65) Prior Publication Data

US 2003/0155310 A1 Aug. 21, 2003

(30) Foreign Application Priority Data

May 5, 2000 (NO) .......................................... 20002383

(51) Int. Cl.[7] .............................................. B01D 17/06
(52) U.S. Cl. ................................. 210/243; 210/DIG. 5; 204/660
(58) Field of Search ................................ 210/748, 708, 210/243, DIG. 5; 204/563–570, 660–674

(56) References Cited

U.S. PATENT DOCUMENTS

| | | | |
|---|---|---|---|
| 4,116,790 A | * | 9/1978 | Prestridge .................. 204/563 |
| 4,601,834 A | | 7/1986 | Bailes et al. |
| 5,372,690 A | * | 12/1994 | Gardner-Clayson et al. ..... 204/255 |
| 5,861,087 A | * | 1/1999 | Manning .................... 204/272 |
| 6,730,205 B2 | * | 5/2004 | Holland ...................... 204/557 |

OTHER PUBLICATIONS

O. Urdahl et al., Electrostatic Destabilization of Water–In–Oil Emulsions Under Conditions of Turbulent Flow, Trans IChemE, vol. 74, 1996, pp. 158–165.

* cited by examiner

Primary Examiner—Frank M. Lawrence
(74) Attorney, Agent, or Firm—Venable LLP; Eric J. Franklin

(57) ABSTRACT

An electrically energised device for coalescing a first conductive fluid, emulsified in a second fluid, comprising a tube member (1), having at least one fluid inlet (2) and at least one fluid outlet (3), the tube B member (1) defining a flow channel (4) for an emulsion of the first and second fluid from its inlet side to its outlet side and comprising at least one electrically insulating layer portion, the channel B (4) having a generally circular or elliptic cross section, and an interacting pair of a first and a second electrode (5, 6) that are arranged outside and adjacent to the at least one insulating layer portion, that separates the electrodes (5, 6) from the channel (4) and thereby from immediate contact with the emulsion, and supplied with a pulsed or alternating voltage for the purpose of subjecting the first and second fluid flowing through the flow channel to an electrostatic field. The first and second electrode (5, 6) are separated with a gap and extend generally in parallel in the length direction of or helically around the flow channel (4).

13 Claims, 2 Drawing Sheets

ELECTROSTATIC COALESCER DEVICE

TECHNICAL FIELD

The present invention relates to an electrically energised device for coalescing a first conductive fluid, emulsified in a second fluid, comprising: a tube member, having at least one fluid inlet and at least one fluid outlet, said tube member defining a flow channel for an emulsion of the first and second fluid from its inlet side to its outlet side and comprising at least one electrically insulating layer portion, said channel having a generally circular or elliptic cross-section, and an interacting pair of a first and a second electrode that are arranged outside and adjacent to the at least one insulating layer portion, that separates the electrodes from the channel and thereby from immediate contact with the emulsion, and supplied with a pulsed or alternating voltage for the purpose of subjecting the first and second fluid flowing through the flow channel to an electrostatic field.

Since the invention is particularly applicable to electrostatic coalescer devices for promoting the coalescense of water in an emulsion comprising oil and water, it will be described with reference to such an application. However, it should be understood that it is applicable to all kinds of coalescer applications in which there is possible to affect and promote the coalescense of a first fluid in an emulsion comprising a first and a second fluid by means of an electric field applied to the emulsion.

Although the invention is applicable to all kinds of oil-treatment lines, it is particularly advantageous in offshore applications in which a coalescer is arranged for the purpose of promoting or effectuating a pre-separation of water from oil, or a water droplet enlargement, before an extracted emulsion comprising oil and water is further conducted to a subsequent settling tank for gravitational settling of the oil. In such an application the coalescer contributes to an important reduction of the overall weight of the settling arrangement.

BACKGROUND OF THE INVENTION

In the oil industry where oil is extracted from one ore more wells in an oil field oil will be extracted together with water. The water has to be removed from the oil and this is mainly done by means of settling tanks in which the oil is permitted to settle through the action of the gravitational force. However, complex oil-water emulsions may develop during the extraction of the oil. For example, the removal of gas from the oil-water emulsion by means of gas-liquid cyclones might contribute to a more complex emulsion, which will be difficult to separate only by means of settling.

PRIOR ART

It is well known to arrange so called electrostatic coalescers for the purpose of obtaining a destabilisation of water-in-oil emulsions, that is a water droplet enlargement or coalescense of water in the oil.

U.S. Pat. No. 4,601,834 discloses an electrostatic coalescer in which one of the electrodes is arranged at the inner periphery of a duct-defining tube, while the other electrode is located at the outer periphery of the same tube on the opposite side thereof. Such an arrangement has the disadvantage that the inner electrode has to be covered with an insulating material, and that the inner electrode will also be a physical hinder for the emulsion flowing in the duct through the coalescer. However, contemporary coalescers with a circular or elliptic channel cross-section still present this somewhat disadvantageous design.

In a publication by O. Urdahli et al, entitled "Electrostatic destabilisation of water-in-oil emulsions under conditions of turbulent flow", Trans IchemE, vol 74, Part A, March 1996, p. 158–165, there is disclosed an electrostatic coalescer the electrodes of which are located on opposite sides of and outside a tube that defines a flow channel with a rectangular cross section. The electrodes are parallel plates which are insulated from the emulsion by an insulating wall of the tube of the coalescer. A number of electrode pairs are arranged in the length direction of the tube. However, a disadvantage by such an arrangement is the non-optimised distribution of the electric field over the cross-section of the emulsion flow channel. Moreover, for full-scale applications, a rectangular channel is not practical. However, a channel with a circular or elliptic cross-section would be preferred instead.

THE OBJECT OF THE INVENTION

It is an object of the invention to provide an electrically energised coalescer device with active electrodes that are saved from direct contact with an emulsion that is treated by means of the device. The construction of the device shall promote an optimised distribution of an electric field over the cross-section of the emulsion flow channel. The device shall also be operatively reliable and shall promote an easy maintenance thereof.

BRIEF DESCRIPTION OF THE INVENTION

The object of the invention is obtained by means of the initially defined device, characterised in that the first and second electrodes are separated with a gap and extend continuously generally in parallel in the length direction of or helically around the flow channel. Thereby an advantageously distributed electric field is obtained in the flow channel through which the treated emulsion is flowing.

Extending in parallel in or with the length direction of the channel corresponds to the extreme case of a helix with an infinite pitch. In such a case it is preferred that the respective electrodes are sheet-like and present an inner curvature that is generally parallel to the adjacent inner periphery of the tube member, i.e. to the adjacent outer periphery of the channel. Each such electrode may then cover or enclose a sector of the channel. The electrodes then define two layers or linings, arranged at opposite sides of the channel and enclosing at least a part of the cross section of the channel.

Preferably, the flow channel defined by the inner periphery of the tube member has a generally circular cross-section. In full-scale applications for the treatment of oil-water emulsions, this is an advantageous design, and the double helical arrangement of the electrodes will result in a particularly well distributed electric field in a channel with such a cross section.

The tube member is preferably generally cylindric, the electrodes being either attached to the outer periphery of the tube member or being located inside the wall of the tube member. In the latter case the electrodes are preferably moulded into the tube member wall or inserted into pre-arranged recesses therein.

The tube member preferably comprises an inner layer adapted to be in direct contact with the emulsion of first and second fluid flowing in the flow channel and being able to withstand high electrical fields, an intermediate layer in direct contact with the electrodes and being able to withstand high electrical fields, and an outer layer. The material of one of the layers should be adapted to withstand the pressure load better than the materials of the other layers. The inner layer material should be chemically compatible with the emulsion and resistant against high electric fields. Examples of such a material are PEEK, Plexiglas or a thermoplastic. The main constituent of the intermediate layer is preferably a curable resin, such as epoxy, or a polymer composite material while the main constituent of the outer layer preferably is a polymer or a fibre-reinforced polymer or steel. The electrodes are preferably located in the intermediate layer.

Further features and advantages of the present invention are presented in the following detailed description and the further dependent claims.

BRIEF DESCRIPTION OF THE DRAWINGS

Below, preferred embodiments of the device according to the invention will be described more in detail with reference to the enclosed drawings, on which.

DETAILED DESCRIPTION OF THE INVENTION

Figure 1:
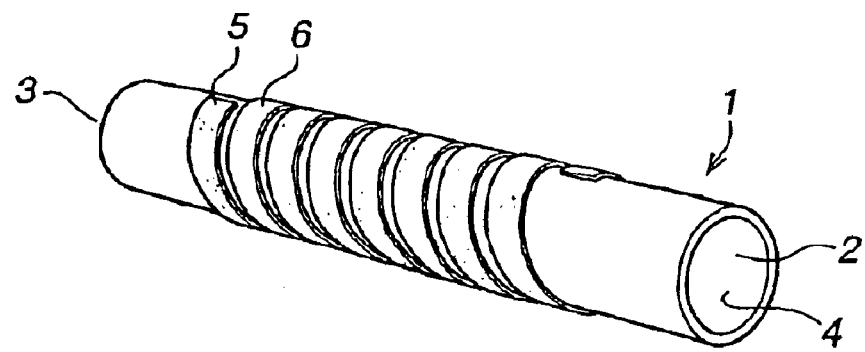
FIG. 1 is a perspective view showing a first embodiment of the inventive device.

FIG. 1 shows a first embodiment of the coalescer device according to the invention. The coalescer comprises a tubular member 1, which defines a cylinder with an inlet 2 and an outlet 3. The tubular member 1 encloses and defines a flow channel 4 for a medium. The channel has a generally circular cross-section. Preferably, the tube member 1 is arranged in line with a pipe or conduit for conducting an emulsion comprising a first and a second fluid. The emulsion could be any one in which one of the fluids has such characteristics that a coalescense thereof can be obtained as a result of an electric field being applied to the emulsion. In a particularly preferred application the tube member is arranged in line with a pipe for conducting an extracted oil-water emulsion from a well to a settling tank. The first fluid is then water and the second fluid is oil, and the coalescense of the water is affected and promoted by means of the inventive coalescer before the emulsion reaches a subsequent settling tank (not shown).

The device comprises a first electrode 5 and a second electrode 6 attached to the tubular member 1 on the outer surface thereof. The wall of the tube member 1 defines an electrically insulating portion that separates the electrodes 5, 6 from the channel 4 and thereby from immediate contact with the medium that flows through the latter.

The electrodes 5, 6 are typically copper electrodes that extend helically around the outer periphery of the tube member 1. They extend over the same section of the tube member 1. They are either cast together with the tube member and thereby attached to the latter, or attached to the outer surface by any other suitable means, for example by gluing. They are separated with a gap or displaced in the length direction of the tube member 1, such that, thanks to the interaction of the electrodes, a suitably distributed electric field is generated in the channel 4 when a pulsed voltage or an alternating voltage is applied to the electrodes during the operation of the coalescer.

Each electrode is continuous and has only one electrical connection point. One of them is connected to ground while the other one is connected to a voltage supply source.

The electrodes could have a symmetric cross-section, for example circular, or have a more sheet-like design. In the embodiments of FIGS. 1–4 they are sheet-like and present a curvature that corresponds to (is parallel to) the inner periphery of the respective adjacent portions of the inner periphery of the tube member 1, that is the outer periphery of the channel 4. For the extreme case of an infinite helix pitch, that is parallel electrodes extending at opposite sides of the channel 4, sheet-like electrodes that enclose a part of the channel 4, preferably a major part thereof, are preferred.

For a tube member with an inner diameter of 40 mm the gap, i.e. the distance between the electrodes, is in the range of 5–30 mm and the width of the sheet-like electrodes is in the range of 15–35 mm. The helix curve defined by each electrode preferably has a pitch in the range of 50–110 mm/turn. In this case the voltage will be up to 10 kV.

The inner diameter of the tube member 1, that is the diameter of the channel 4, is in the range of 25–500 mm. The distance between and the width of the electrodes, the pitch and the voltage depend on the inner diameter.

A voltage supply (not shown) supplies the first and second electrodes 5, 6 with a pulsed unipolar high voltage, i.e. pulsed DC, in the frequency range from 1–2000 Hz, preferably 10–500 Hz and most preferably 50–500 Hz. Alternatively, the voltage supply supplies the first and second electrodes with an alternating voltage, with the same frequencies as for the pulsed DC. The difference in the settling behaviour of an oil-water emulsion in the above ranges is rather small, but especially when the first fluid is salt water the higher intervals are preferred.

It must be pointed out, however, that the optimum frequency range depends on the electrical properties of the emulsion and the tube member material, and also on the design of the tube member 1 (thickness of the insulating layer or layers).

High voltage is preferred, from 1 kV up to approximately 100 kV AC, and a higher voltage can be applied in order to compensate, but only to some extent, for non-ideal frequency.

Figure 2:
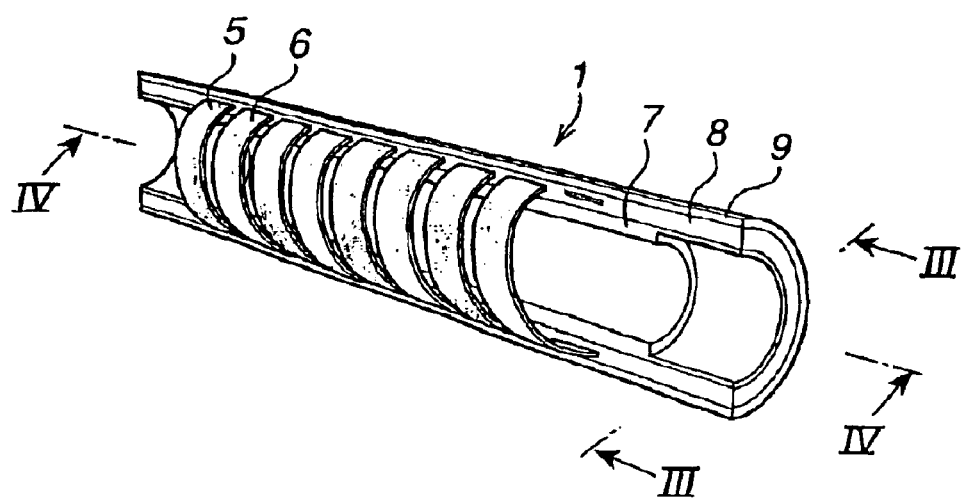
FIG. 2 is a perspective view showing a second embodiment of the inventive device.
Figure 3:
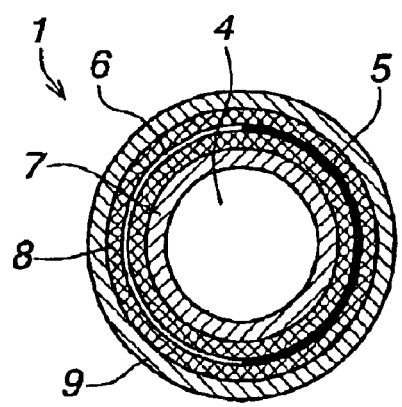
FIG. 3 is a cross-section according to III—III in FIG. 2.
Figure 4:
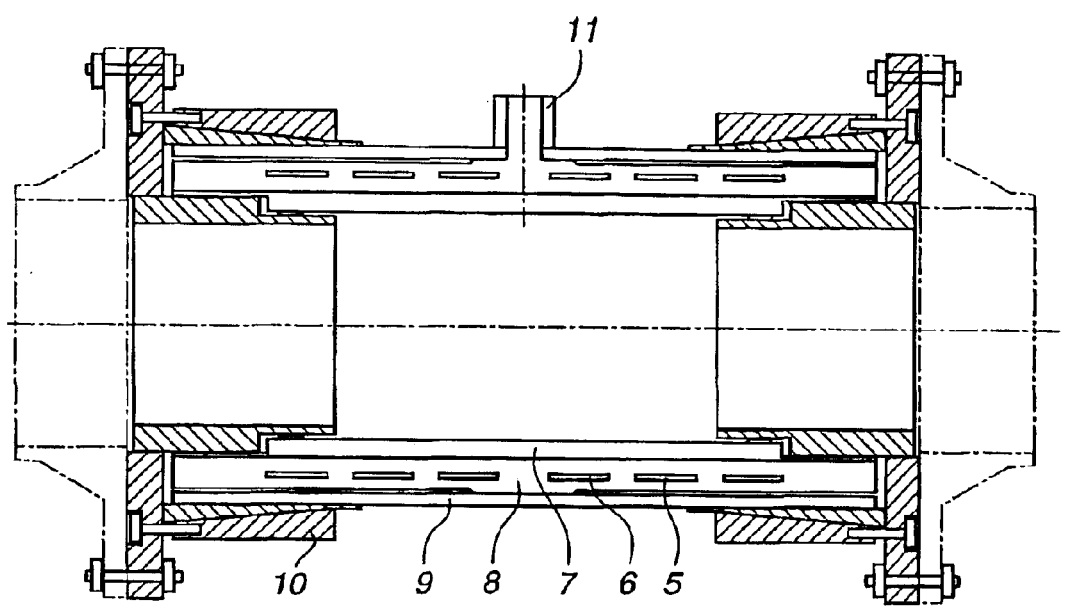
FIG. 4 is a cross-sectional view according to IV—IV in FIG. 2.

FIGS. 2–4 shows an alternative embodiment of the inventive coalescer, by which the tube member comprises a plurality of individual, interconnected layers 7–9. Here, the device comprises three layers, namely an inner layer 7 adapted to be in direct contact with the emulsion of first and second fluid flowing in the flow channel 4, an intermediate layer 8 in direct contact with the electrodes 5, 6, and an outer layer 9. Preferably, at least the inner and intermediate layers are electrically insulating and able to withstand strong electric fields. At least one of the layers, preferably the outer layer, should be adapted to withstand the pressure load better than the other layers.

FIG. 4 shows the tubular member according to FIGS. 2 and 3 as provided with a means 10 for connecting the tube member 1 in line with a pipeline (not shown) for conducting the emulsion. The means 10 comprises a pair of flanges arranged at the inlet side and outlet side respectively of the tube member 1 and adapted to be connected to the pipeline. Thereby, the coalescer can be readily arranged in line with the pipeline and also readily substituted in case of failure or need of maintenance.

In FIG. 4, there is also shown a recess 11 in the tube member 1 for insertion of a connection between the electrodes 5,6 and a voltage supply source.

For pipelines of large dimensions, where the cross section of pipeline is large, it might be appropriate to use a number of parallel tube members 1 with smaller cross-sectional areas in order to keep the required voltages at a reasonable level to obtain the desired electric field strength across the flow channel 4 of each such tube member 1. Then the flanges 11 should be replaced or at least supplemented by any suitable branch joints.

It should be understood that a number of alternative embodiments of the inventive device will be obvious for a man skilled in the art without, however, going beyond the scope of the invention as delimited by the appended claims supported by the description and the drawings.

What is claimed is:

1. An electrically energised device for coalescing a first conductive fluid, emulsified in a second fluid, comprising:

a tube member (1), having at least one fluid inlet (2) and at least one fluid outlet (3), said tube member (1) defining a flow channel (4) for an emulsion of the first and second fluid from its inlet side to its outlet side and comprising at least one electrically insulating layer portion, said channel (4) having a generally circular or elliptic cross-section, and an interacting pair of a first and a second electrode (5, 6) that are arranged outside and adjacent to the at least one insulating layer portion, that separates the electrodes (5, 6) from the channel (4) and thereby from immediate contact with the emulsion, and supplied with a pulsed or alternating voltage for the purpose of subjecting the first and second fluid flowing through the flow channel to an electrostatic field, characterised in that the first and second electrode (5, 6) are separated with a gap and extend continuously, generally in parallel in the length direction of or helically around the flow channel (4) for promoting an optimized distribution of an electric field over the cross-section of the emulsion flow channel.

2. A device according to claim 1, characterised in that at least one of the first and second electrode (5, 6) is attached to the outer periphery of the electrically insulating layer.

3. A device according to claim 1, characterised in that the tube member (1) is generally cylindric.

4. A device according to claim 1, characterised in that the first and second electrodes (5) are attached to the outer surface of the tube member (1).

5. A device according to claim 1, characterised in that the first and second electrodes (5, 6) are located inside the wall of the tube member (1).

6. A device according to claim 5, characterised in that the tube member wall is constituted by a plurality of electrically insulating layers (7, 8, 9), comprising an inner layer (7) adapted to be in direct contact with the emulsion of first and second fluid flowing in the flow channel (4) and being able to withstand high electrical fields, an intermediate layer (8) in direct contact with the electrodes (5, 6) and being able to withstand high electrical fields, and an outer layer (9).

7. A device according to claim 6, characterised in that the main constituent of the inner layer (7) is one of PEEK, Acrylic and a thermoplastic.

8. A device according to claim 6, characterised in that the main constituent of the intermediate layer (8) is a curable resin or a polymer composite material.

9. A device according to claim 7, characterised in that the main constituent of the outer layer (9) is a fibre-reinforced polymer.

10. A device according to claim 1, characterised in that it comprises means (10) for connecting the tube member in line with a pipeline for conducting the emulsion.

11. A device according to claim 1, characterised in that it is connected to a voltage supply means that supplies the first and second electrodes with a pulsed unipolar high voltage in the frequency range from 1 Hz to 2000 Hz.

12. A device according to claim 1, characterised in that is connected to a voltage supply means that supplies the first and second electrodes with an alternating voltage in the frequency range from 1 Hz to 2000 Hz.

13. A device according to claim 1, characterised in that the first fluid is water and the second fluid is oil.

* * * * *